J. W. DOUD.
Grain Drill.
No. 95,669.
Patented Oct. 12, 1869.
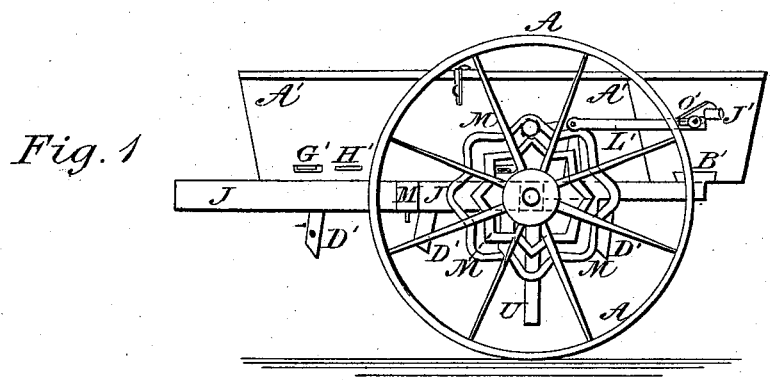
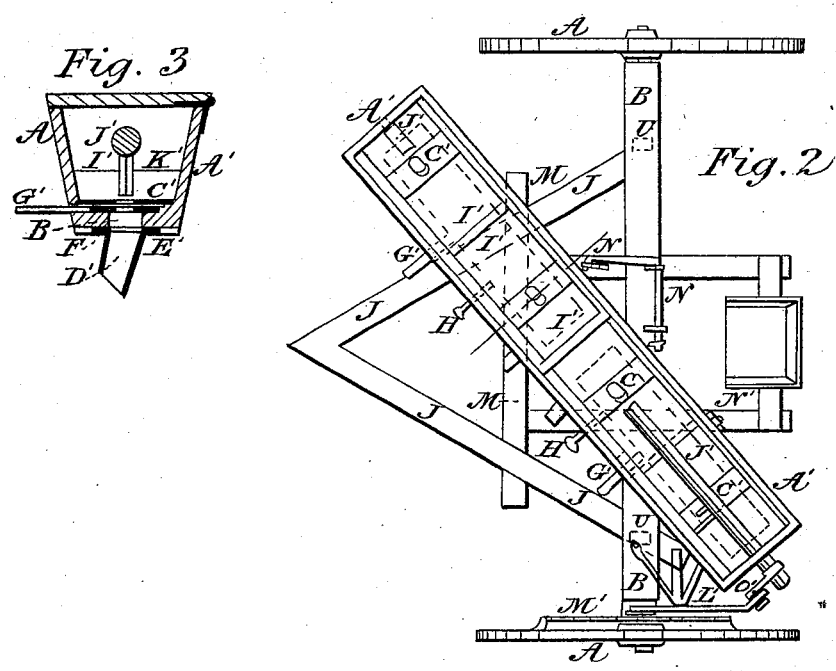

United States Patent Office.

JOHN W. DOUD, OF WARD'S CORNERS, IOWA.

Letters Patent No. 95,669, dated October 12, 1869.

---

IMPROVEMENT IN COMBINED SEED-SOWER AND CULTIVATOR.

---

The Schedule referred to in these Letters Patent and making part of the same.

---

*To all whom it may concern:*

Be it known that I, JOHN W. DOUD, of Ward's Corners, in the county of Buchanan, and State of Iowa, have invented a new and useful Combined Seed-Sower and Cultivator; and I do hereby declare that the following is a full, clear, and exact description thereof, which will enable others skilled in the art to make and use the same, reference being had to the accompanying drawings, forming part of this specification, in which—

Figure 1 is a side view of the seed-sower, and part of the cultivator-frame.

Figure 2 is a top view of the same, the seed-box cover being removed, and part of the agitator-shaft being broken away.

Figure 3 is a detail cross-section of the seed-box, taken through the line x x, fig. 2.

Similar letters of reference indicate corresponding parts.

My invention has for its object to combine with my improved cultivator, patented January 7, 1868, and numbered 73,173, a broadcast seed-sowing attachment, which shall be simple in construction, and so constructed and arranged as to work accurately and well; and It consists in the construction of various parts of the seed-sower, and in their combination with the cultivator, as hereinafter more fully described.

A are the wheels; B, the axle; J are the inclined bars; M is the cross-bar; and N is the lever by which the plows are raised from the ground, about the construction of which parts there is nothing new, except that the form and position of the lever N are changed to accommodate the seed-box.

A' is the seed-box, which is made long, and is fastened diagonally to the axle B and inclined bar J, as shown in fig. 2.

The bottom of the seed-box A' is slotted longitudinally through its middle part, with a dovetailed slot, in which is placed a dovetailed bar, B', which slides longitudinally in said groove.

The sliding bar B' has holes formed in it at suitable distances apart, and of such a size as to allow the seed to pass through freely, and is designed to prevent the escape of the seed when desired, when turning or passing from place to place.

The slot in the bottom of the seed-box A' is covered upon its inner side with a plate or plates, C', having oblong or oval holes formed through it, corresponding in position with the holes in the sliding bar B', through which the seed passes into the holes in the said sliding bar B, through which the said seed passes to the sowing-spouts D', by which it is conducted to the ground.

The upper ends of the spouts D' are attached to the plates E', which are attached to the stationary parts of the bottom of the seed-box A', and which are made of such a breadth as to cover the holes in the sliding bar B', and prevent the seed from escaping before it reaches the open upper ends of the spouts D'.

F' is a plate, sliding in groves, in the stationary parts of the bottom of the seed-box A', between the sliding bar B' and the perforated plate or plates C'.

The plate F' has oblong or oval holes formed through it, corresponding in position with the position of the holes in the plate C', so that by adjusting the position of the said plate F', the size of the sowing-holes may be adjusted at will, to regulate the amount of seed being sown.

The plate F' is made in two parts, as shown in dotted lines in fig. 2, for convenience in accurately adjusting the size of the sowing-holes.

The plate F' is adjusted by means of levers G' attached to it, and projecting through slots in the seed-box A'.

The plate F' is secured in place, when adjusted, by the set-screws H', which pass in through the side of the seed-box A', and press against the said plate.

In the bottom of the seed-box A', between the holes in its bottom, are placed triangular blocks I', or blocks bevelled at both ends, to guide the seed into such a position that it may readily pass into the dropping-holes.

J' is a shaft, passing longitudinally through the seed-box A', and working in bearings in the ends of said box.

To the lower side of the shaft J', directly above each sowing-hole in the bottom of the said seed-box A', are attached arms K', which, as the shaft J' rocks in its bearings, stir or agitate the seed above the sowing-holes, to cause it to pass freely through said holes.

To the projecting end of the shaft J' is rigidly attached a short crank, O', to the crank-pin of which is pivoted the end of the lever L'.

The lever L' is pivoted to supports attached to the frame or axle of the machine, and to its other end is attached a pin, which enters the zigzag space or groove in the zigzag wheels or wheel M', attached to the wheel A, so that, as the machine is drawn forward, the shaft J' may be rocked automatically to agitate the seed.

The sliding bar B' is operated to prevent the escape of the seed by means of the hand-lever N' connected with said sliding bar, and pivoted to the side of the seed-box A'.

Having thus described my invention,

What I claim as new, and desire to secure by Letters Patent, is—

1. The combination of the vibrating stirrer-arm K, with the hopper A', the latter being constructed and adjusted in all its parts, as shown and described.

2. The combination of the above parts, constituting the seeder, with the axle B and inclined bars J, as and for the purpose specified.

JOHN W. DOUD.

Witnesses:
CHARLES L. AKERS,
A. E. CARPENTER.